United States Patent [19]

Grevstad

[11] Patent Number: 4,612,262

[45] Date of Patent: Sep. 16, 1986

[54] PROCESS FOR ADDING ELECTROLYTE TO A FUEL CELL STACK

[75] Inventor: Paul E. Grevstad, West Hartford, Conn.

[73] Assignee: United Technologies Corporation, Hartford, Conn.

[21] Appl. No.: 638,337

[22] Filed: Aug. 6, 1984

[51] Int. Cl.[4] .............................................. H01M 8/04
[52] U.S. Cl. ........................................ 429/14; 429/34; 429/41; 429/72
[58] Field of Search ....................... 429/14, 34, 41, 72

[56] References Cited

U.S. PATENT DOCUMENTS

| | | | |
|---|---|---|---|
| 4,176,213 | 11/1979 | Van Linden | 429/14 X |
| 4,185,145 | 1/1980 | Breault | 429/41 X |
| 4,450,212 | 5/1984 | Feigenbaum et al. | 429/35 |
| 4,463,066 | 7/1984 | Adlhart et al. | 429/34 |
| 4,463,068 | 7/1984 | Cohn et al. | 429/34 |
| 4,467,019 | 8/1984 | Feigenbaum | 429/34 |
| 4,487,157 | 12/1984 | Bergeron et al. | 118/323 X |

FOREIGN PATENT DOCUMENTS

57-92759  6/1982  Japan ...................................... 429/14

Primary Examiner—Brian E. Hearn
Assistant Examiner—Stephen J. Kalafut
Attorney, Agent, or Firm—Stephen E. Revis

[57] ABSTRACT

Electrolyte is replenished in a fully assembled stack of fuel cells by depositing dilute electrolyte of known concentration on an external vertical face of the stack. The electrolyte is absorbed into the cell components through their edges by capillary action. Electrolyte is continuously deposited on the stack surface until the electrodes and matrix layers of the stack are fully saturated. Thereafter the stack is heated and water is evaporated until the stack has a desired operable electrolyte volume and electrolyte concentration therein. By knowing the total volume of electrolyte in the stack when the stack is fully saturated, and by knowing the concentration of the electrolyte in the fully saturated stack, the conditions under which water is thereafter evaporated may be controlled to result in the desired electrolyte volume and electrolyte concentration within the stack.

6 Claims, 4 Drawing Figures

PROCESS FOR ADDING ELECTROLYTE TO A FUEL CELL STACK

TECHNICAL FIELD

This invention relates to fuel cells and more particularly to adding electrolyte to fuel cells.

BACKGROUND ART

As is well known, the electrolyte used in fuel cells is lost slowly over a period of time, mostly by evaporation into reactant gases passing through the cell. A matrix layer disposed between the electrodes of the cell holds the electrolyte in position between the electrodes during cell operation. The electrolyte within the matrix provides a liquid barrier preventing commingling of the fuel and oxidant gases which flow through the cell on opposite sides of the matrix. If too much electrolyte evaporates from the cell, the reactants may mix with each other through localized areas of the matrix. The electrochemical reaction also stops in those areas.

There is a need to be able to replenish the lost electrolyte at predetermined intervals, the intervals being chosen to assure that the electrolyte volume does not fall below some minimum, safe level. It is desired to be able to refill the cells to a predetermined level and concentration which is uniform from cell to cell. It is too costly to take the stack apart to add acid to the individual cells of the stack. A system is needed to enable the refilling of the cells in a stack without disassembling the stack.

Several U.S. patents representative of the prior art relating to filling fuel cells stacks with electrolyte are U.S. Pat. Nos. 4,366,211; 4,383,008; and 4,383,009. All of these prior art systems require numerous additional stack pieces, as well as the addition of slots, drilled holes, and other modifications to most, if not all, of the fuel cell electrodes, matrices, and separator plates. The extra expense of these features and the difficulty in maintaining proper tolerances for hole alignment from cell to cell are undesirable. Also, in some of these prior art patents a head of electrolyte is established at the bottom end of the stack due to columns of the electrolyte interconnected vertically through the stack. This can result in an uneven distribution of electrolyte within the cells. The stack must also be sealed to hold that acid pressure during filling. None of these patents address the problem of obtaining the desired amount and concentration of electrolyte in each cell.

It is desirable to have an inexpensive system for adding electrolyte to fuel cells. Preferably the system should fill the stack uniformly to a desired electrolyte volume and concentration, and should not require significant redesign or reoperation of fuel cell stack components.

DISCLOSURE OF INVENTION

One object of the present invention is an improved system for adding electrolyte to an assembled fuel cell stack.

A further object of the present invention is a system for adding electrolyte to a fuel cell stack, which system does not require costly modifications to existing fuel cell stack components.

Another object of the present invention is a method for refilling a fuel cell stack with electrolyte to a predetermined operating volume and concentration.

Yet another object of the present invention is a system for adding electrolyte to a fuel cell stack uniformly throughout the height of the stack.

According to the present invention, electrolyte is added to a fuel cell stack to a desired concentration and volume by depositing dilute electrolyte on an external face of the stack until all the electrodes and matrix layers of the stack are fully saturated, excess water in the saturated stack thereafter being evaporated under selected conditions of humidity and temperature until the stack has the desired electrolyte volume and electrolyte concentration therein.

More specifically, dilute electrolyte, the concentration of which is known, is applied to the stack face and is absorbed into porous cell components through their edges by capillary action. This is continued until the stack is fully saturated. The concentration of the electrolyte in the fully saturated stack will be substantially the same as the concentration of the electrolyte deposited on its face. The volume of electrolyte in the fully saturated stack can be determined experimentally or calculated closely by knowing the size and pore spectra of the stack components. Water is then evaporated from the saturated stack, such as by passing a gas stream through reactant gas channels of the stack under controlled conditions of humidity and stack temperature. The concentration of electrolyte deposited on the face of the stack, the temperature to which the stack is heated during the evaporation phase of the process, and the dew point of the gas used to evaporate water from the saturated stack are selected such that, when a steady state condition is reached during the evaporation phase of the process, the concentration and volume of the electrolyte remaining in the stack will be that which was desired.

A major advantage of the present process is in its simplicity. No special channels or holes need to be formed in the stack components, and no extra stack pieces are required in order to add the electrolyte.

Since the porous components of every cell in the stack are initially fully saturated with the same concentration of electrolyte, and are then subjected to the same environment which causes water to be evaporated therefrom until a steady state condition exists, every cell in the stack will end up with virtually the same volume and concentration of electrolyte; and this volume and concentration of electrolyte may be selected in advance by controlling the variables of the process. Obtaining a uniform electrolyte distribution throughout the stack and being able to control the final concentration and volume of electrolyte has not been possible using prior art processes.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
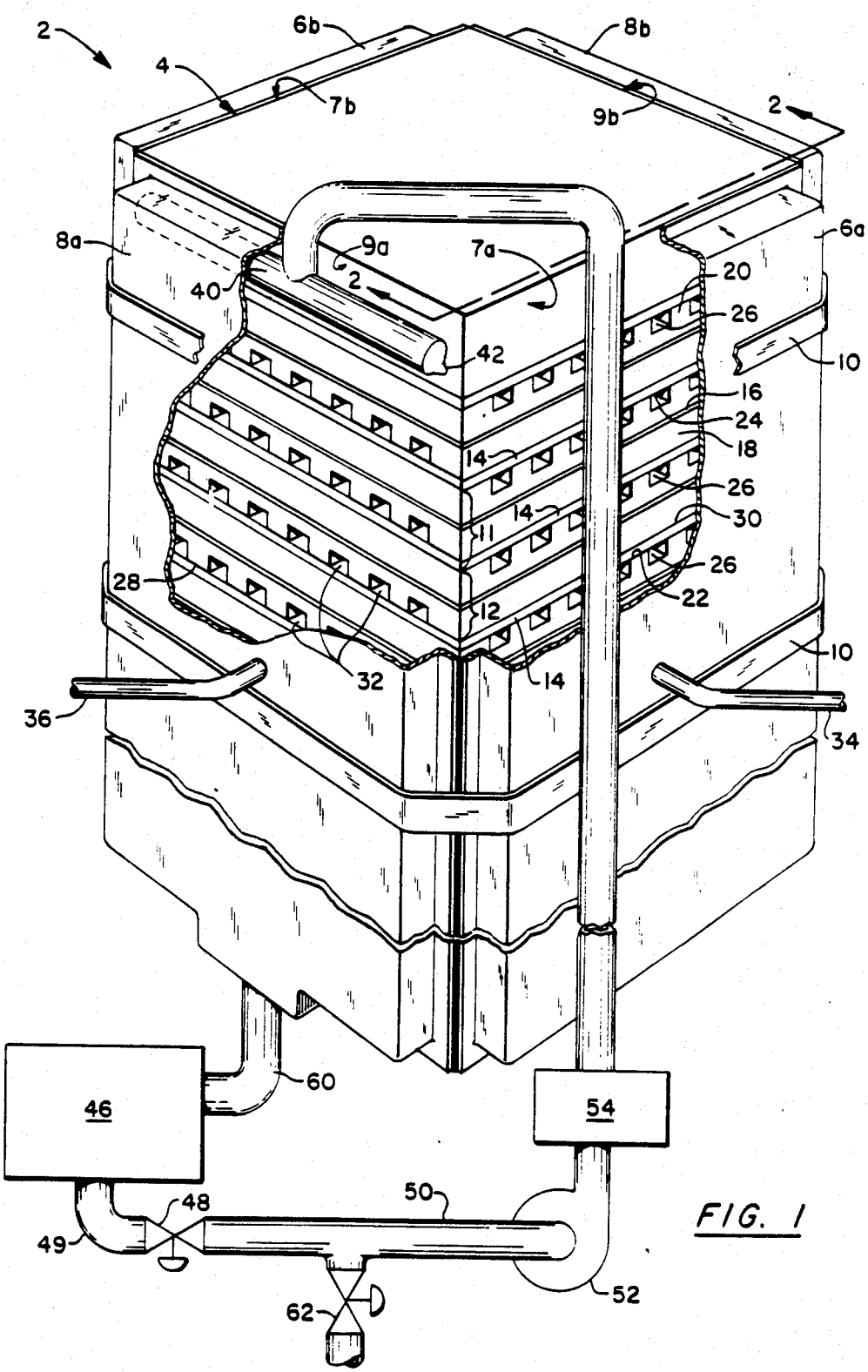
FIG. 1 is a simplified perspective view (not to scale), partly broken away, of a fuel cell system incorporating the features of the present invention.
Figure 2:
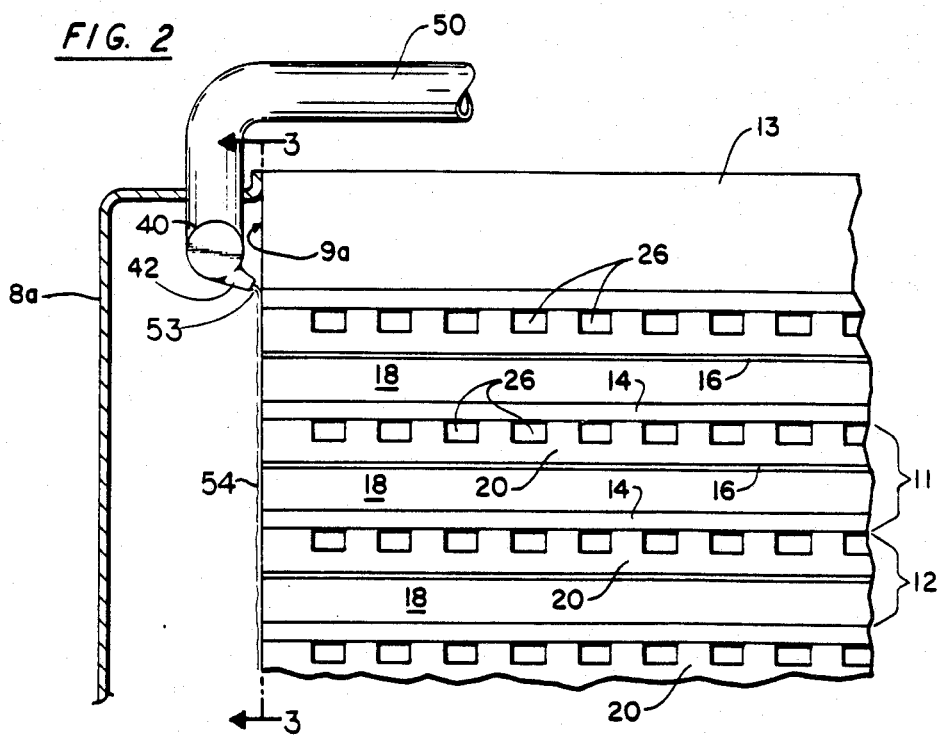
FIG. 2 is an enlarged sectional view taken along the line 2—2 of FIG. 1
Figure 3:
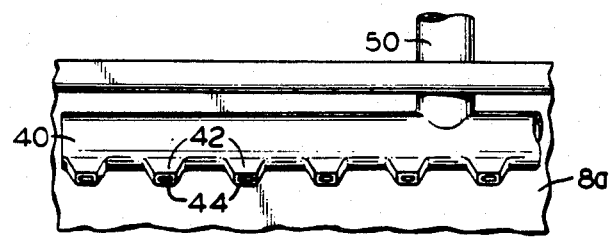
FIG. 3 is a sectional view taken along the line 3—3 of FIG. 2.

Referring to FIG. 1, a fuel cell system is generally referred to by the reference numeral 2. In this preferred embodiment the electrolyte is phosphoric acid; however, the invention is not intended to be limited thereto. The assembly 2 includes a fuel cell stack 4 with reactant gas manifolds 6a, 6b, 8a, 8b covering each of the four external vertical faces 7a, 7b, 9a, 9b, respectively, of the stack. Manifolds 6a, 6b are the fuel (i.e. hydrogen) inlet and outlet manifolds, respectively; and manifolds 8a, 8b are the oxidant (i.e. air) inlet and outlet manifolds respectively. The manifolds are held in sealing relationship to the faces of the stack by any suitable means such as by a plurality of bands 10. The faces 7a, 7b, 9a, 9b are hereinafter referred to, respectively, as the fuel inlet face, fuel outlet face, oxidant inlet face and oxidant outlet face.

Each stack 4 is comprised of a plurality of repeating fuel cell units 11. The fuel cell units 11 are stacked one atop the other. A thick carbon end plate 13 rests on top of the stack. A stack may contain only a few cells or several hundreds of cells. Each cell may have an active (catalyzed) surface area of only a very few square inches up to 10 square feet or more, depending upon the application for which the system is designed. The present invention is particularly suited for use with stacks containing relatively large numbers of fuel cells of fairly large size, since those are the types of systems which are the most difficult to uniformly refill with electrolyte; however, the present invention is not intended to be limited to any particular size cell or stack.

Each cell unit 11 comprises a fuel cell 12 and a sheet-like separator 14. The separator 14 is flat and substantially nonporous to both the reactant gases and the electrolyte. Separators may be made by any known method from any material which is compatible with and can withstand the operating environment within the cells. When the fuel cell electrolyte is phosphoric acid these plates are usually made from graphite. For example, they may be made by molding, under pressure, a dry mixture of graphite powder and thermosetting resin, the molded parts subsequently being cured and then heat treated to a temperature of at least 2000° C. to graphitize the resin. Preferably the separator is no greater than 50 mils thick with 30 to 40 mils thick being most preferred. A suitable separator plate is described in commonly owned U.S. Pat. No. 4,301,222, Emanuelson et al, and is incorporated herein by reference.

The fuel cells 12 may be similar to those shown and described in commonly owned U.S. Pat. No. 4,115,627 which is incorporated herein by reference. Each cell 12 includes a thin, sheet-like electrolyte retaining matrix layer 16 sandwiched between a sheet-like anode electrode 20 disposed on one side thereof and a sheet-like cathode electrode 18 disposed on the other side thereof. The matrix layer 16 between the anode and cathode electrodes may be a 5 mil thick layer of silicon carbide held together by a binder such as polytetra-fluoroethylene, and described in commonly owned U.S. Pat. No. 4,017,664, incorporated herein by reference.

The anode and cathode electrodes each comprise a relatively thick fibrous gas porous sheet-like substrate having a catalyst layer disposed on a flat surface thereof facing the matrix layer 16. The catalyst layer may have a thickness on the order of 2 to 5 mils. The substrate thickness may be on the order of about 80 mils thick. In phosphoric acid cells it is usually a finely divided platinum or platinum alloy supported on carbon particles and bonded together with a fluorocarbon polymer. The catalyst is not critical to the present invention. Each anode electrode 20 includes a flat face 22 in contact with the lower surface 24 of a separator 14 disposed directly above it. A plurality of parallel grooves in the electrode face 22 and perpendicular to the fuel inlet face 7a form, with the separator 14, open chennels 26 which extend through the fuel cell 11 to the opposite face 7b of the stack 4. The channels provide gas communication between the fuel inlet manifold 6a and fuel outlet manifold 6b.

Similarly, each cathode electrode 18 has a flat face 28 in contact with the upper surface 30 of the separator disposed immediately below it. The cathode electrode 18 also includes a plurality of parallel grooves in its face 28 perpendicular to the oxidant inlet face 9a and forming, with the separator 14, open channels 32 extending across the stack 4 from the oxidant inlet manifold 8a to the oxidant outlet manifold 8b. The edges of the anode electrodes 20, defining the stack fuel inlet and fuel outlet faces 7a, 7b, respectively, are preferably treated or manufactured such that they act as gas seals which prevent fuel traveling in the channels 26 from leaking into the oxidant manifolds 8a, 8b. Similarly, the edges of the cathode electrodes 18 which form a portion of each of the fuel faces 7a, 7b of the stack 4 are also treated or manufactured to act as gas seals to prevent air from leaking from the channels 32 into the fuel manifolds 6a, 6b. Commonly owned U.S. Pat. No. 4,269,642 describes one method for forming gas seals along the edges of electrode substrates and is incorporated herein by reference.

During normal fuel cell operation fuel enters the manifold 6a via a conduit 34 and travels through the cells via the channels 26 into the fuel outlet manifold 6b. The depleted fuel gas is then carried away from the stack (or recirculated) by means not shown. An oxidant, such as air, enters the oxidant manifold 8a via the conduit 36 and passes through the cells into the oxidant outlet manifold 8b via the channels 32, and is carried away from the stack by means not shown.

Disposed within the oxidant inlet manifold 8a near the top of the stack is a horizontal header 40 which feeds a plurality of nozzles 42 each having an opening 44. An electrolyte storage tank 46, external of the stack 4, holds phosphoric acid electrolyte (diluted with water to a predetermined concentration, as explained below) for use in replenishing the electrolyte lost from the stack 4 during cell operation. A series of conduits provide fluid communication between the tank 46 and the header 40 as further explained hereinbelow.

When it is determined that a stack needs to have its electrolyte replenished, the stack is first taken off line such that it is in a non-operating mode. To add electrolyte to the stack 4 a valve 48 in a conduit 49 is opened which permits electrolyte to flow from the tank 46 into a conduit 50. The electrolyte is pumped through the conduit 50 to the header 40 by a pump 52. A filter 54 disposed within the conduit 50 assures that the electrolyte added to the stack 4 is clean. The nozzles 42 direct streams 53 of the dilute electrolyte against the surface 9a. The number and location of the nozzles 42 and the size of their outlets 44 are designed to create a substantially continuous vertically falling film 54 of electrolyte over the entire surface 9a. This film is, of course, in contact with the edges of the fuel cell components, such as the edges of the matrices 16, the anode electrodes 20 and the cathode electrodes 18. These components are porous, and the electrolyte which comes into contact with their edges is drawn into them and across the cells by capillary action. The cathode electrodes may absorb electrolyte faster than the anode electrodes since the edges of the anode electrodes along the oxidant inlet face 9a of the stack will normally be less porous than the cathode electrode edges due to the presence of the gas seal discussed above. Electrolyte which is not absorbed by the stack runs off the stack face to the bottom of the oxidant inlet manifold 8a. A conduit 60 attached to the bottom of the manifold 8a feeds that excess electrolyte back into the tank 46 for recirculation.

Electrolyte is added and recirculated until a steady state is reached wherein both the anode and cathode electrodes and the matrix layers of every cell in the stack are completely saturated with electrolyte at the same concentration. The valve 48 is then closed and a valve 62 is opened to drain electrolyte from the circulating system and from the manifold 8a. The volume of circulated electrolyte (i.e. the amount in the tank 46) is preferably large relative to the amount of electrolyte remaining in the stack just prior to refilling in order that the concentration of electrolyte in the fully saturated stack at steady state will be esentially the concentration of the electrolyte in the storage tank at the onset of the refilling operation. This eliminates the need to estimate the amount and concentration of electrolyte in the stack at the beginning of the refilling operation.

With the electrolyte circulating system shut off, the external faces of the cell dry quickly. This is an advantage over prior art filling techniques wherein vertical internal channels may stay wet, resulting in shunt currents which can cause serious corrosion of stack components and can also result in potentially large parasitic power losses.

As further explained below, it is necessary to know the total volume of electrolyte held by the stack when fully saturated. This volume will depend upon whether there is electrolyte within the reactant gas channels 32 after steady state has been reached. Unless the channels are completely empty or completely filled, it will not be possible to determine the total volume of electrolyte in the stack. Whether or not the gas channels will become filled may depend upon several factors. The size of the channels is one factor. Large channels will tend to remain empty while small channels will tend to fill and hold electrolyte by capillary action. Also, a slight forward or backward tilt to the face of the stack upon which the dilute electrolyte is deposited, as well as the method for depositing the electrolyte on the face will play a part in whether or not electrolyte enters and stays in those channels. Unless it is known that the channels are filled, it will be necessary to blow or otherwise remove the electrolyte from the channels prior to the evaporation phase of the refilling process to assure that all the channels are empty.

Before operating the stack to produce electricity the liquid volume in each cell must be reduced to a proper level for cell operation, and the electrolyte must also be brought to a suitable operating concentration. The stack is heated to a preselected temperature, which is preferably, but not necessarily, the temperature at which the stack normally operates. This may be done by various means. For example, the process could be conducted within an oven in which the stack is disposed; or heaters could be strapped onto the stack. Preferably the stack's own internal cooling system is used to heat the stack, such as by conducting hot liquid or gas through cooling tubes which pass through the stack at various locations. (Stack cooling systems are shown and described in commonly owned U.S. Pat. Nos. 4,233,369, Breault et al and 4,245,009, Guthrie, both of which are incorporated herein by reference.) Simultaneously with the heating of the stack, a moist gas, such as nitrogen or one of the reactants, having a known dew point, is passed through the fuel channels 26 and/or oxidant channels 32 (if they are empty). During this heating phase water evaporates into the moist gas stream. The process is continued until a steady state is reached and no further water evaporates from the stack. This occurs when the vapor pressure of the water in the gas equals the vapor pressure of the water in the cells. Steady state conditions will determine the final volume of liquid in the stack and the concentration of electrolyte remaining in the stack. Given the known liquid volume held by the stack when fully saturated, other variables, such as the initial concentration of electrolyte in the recirculation storage tank, the dew point of the moist gas stream, and the final temperature of the stack during the evaporation phase of the refilling process are selected to yield a desired volume and concentration of electrolyte within the stack after steady state has been reached.

To prevent damage to the stack by boiling of the liquid, it is necessary to initially heat the stack slowly. As the water is evaporated the rate of heating may be increased. For example, a phosphoric acid fuel cell stack which operates at a nominal temperature of 400° F. was heated from room temperature to about 270° F. at a rate of 4° F. every 15 minutes. The initial concentration of acid in the fully saturated stack was 40% by weight. At 270° the concentration was about 80% by weight. The moist gas was then replaced by hydrogen. The temperature of the stack was further increased at a rate of 15° to 20° F. every 15 minutes until a temperature of 400° F. was reached. Upon reaching this temperature, the stack was put on line (i.e. to produce power). Within a short time (about 30 to 60 minutes) steady state was reached and the acid concentration was at the desired level of about 100%.

Although in the foregoing example a steady state condition was not reached until after the stack was put on line, this is not a requirement of the present process. As a matter of fact, if the stack is not to be immediately put on line, it is usually desirable to keep its electrolyte concentration lower than that which would be preferred while the stack is operating. Thus, prior to putting the stack back in service, the stack could be maintained at some lower temperature. The present process may be used to achieve a wide variety of electrolyte volume and concentration combinations by the appropriate selection of variables.

In the embodiment just described, electrolyte is deposited only on one side or face of the stack. It should be apparent that the same procedure may be utilized simultaneously on other sides of the stack and will speed the refilling process. Furthermore, it is not intended that the invention be limited to depositing electrolyte on the face of the stack by means of a plurality of nozzles fed by a common header which create streams of electrolyte against the surface only near the top of the stack. Any means for depositing the electrolyte in a manner which results in substantially the entire face of the stack being maintained continuously wet (such as with a film of electrolyte which moves down the face) for a sufficiently long period of time to fully saturate the stack to a steady state condition may be used.

Figure 4:
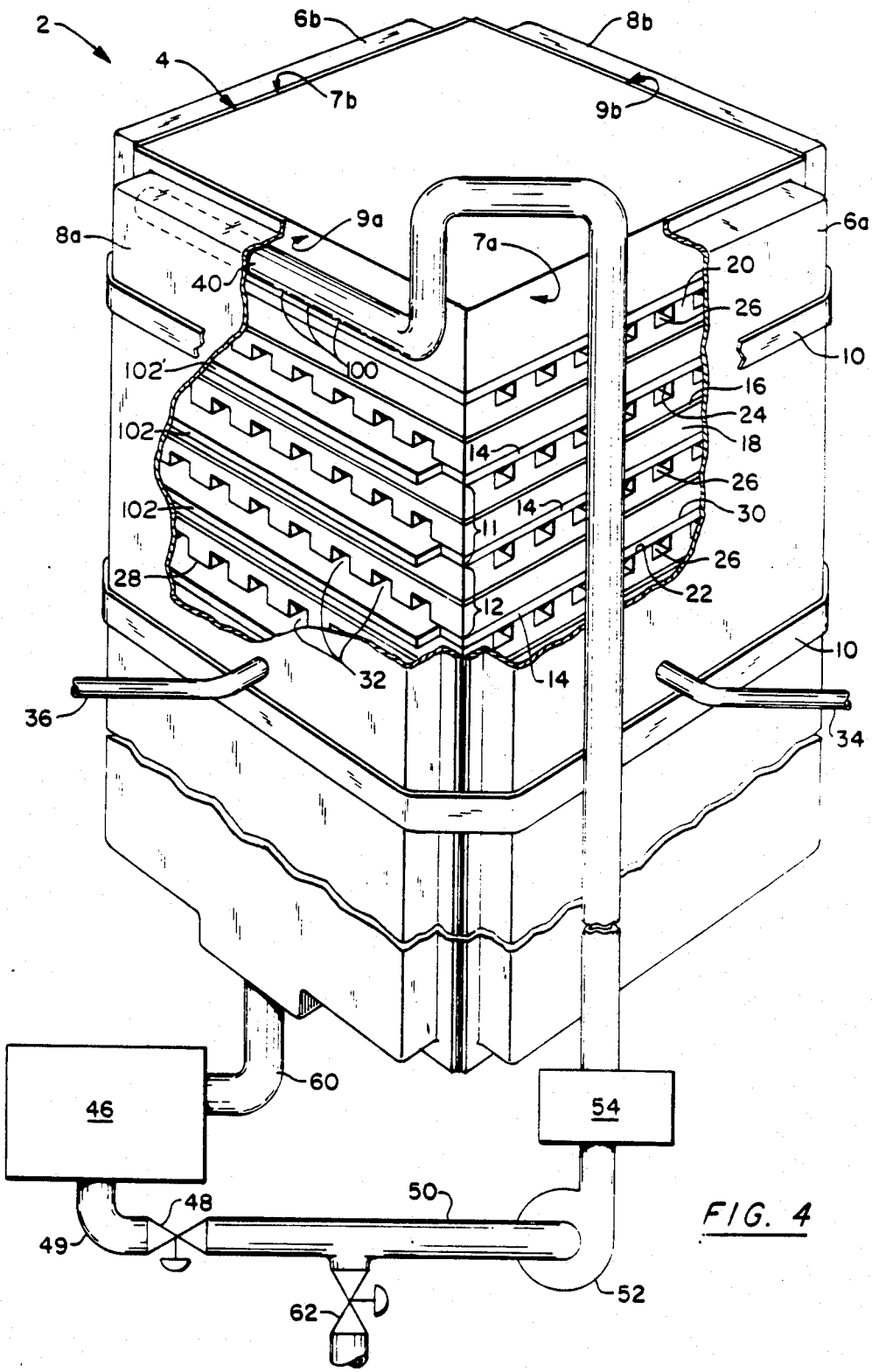
FIG. 4 is a simplified perspective view (not to scale), partly broken away, of a fuel cell system incorporating another embodiment of the present invention.

FIG. 4 shows an embodiment of the present invention described and claimed in commonly owned U.S patent application Ser. No. 638,336, now U.S. Pat. No. 4,596,749 filed on even date herewith, entitled "Method and Apparatus for Adding Electrolyte to a Fuel Cell Stack" by V. Congdon and J. English, incorporated herein by reference. In that invention the separator plates 14 are extended outwardly of the oxidant inlet face 9a to form tabs or shelves 102, the uppermost tab being designated by the reference numeral 102. The nozzles 42 have been replaced by holes 100 in the bottom of the header 40 through which the electrolyte drips onto the uppermost tab 102'. Some of the electrolyte cascades over the edges of the tab 102' and down the vertical face of the stack to the next succeeding tab, and so forth, until a continuous flow of electrolyte is running over the tabs down the face of the stack. The tabs help distribute the electrolyte uniformly over the width and height of the face 9a of the stack. Some of the electrolyte tends to accumulate along the back edges of the tabs. This accumulated electrolyte rests on the tabs against the stack face thereby providing a "reservoir" of electrolyte which is continuously absorbed into the edges of the cell components immediately above each tab. This speeds the refilling process. The reservoir is continuously replenished as electrolyte is deposited on the tabs.

The foregoing and other objects, features and advantages of the present invention will become more apparent in the light of the following detailed description of the preferred embodiments thereof.

I claim:

1. In a process for adding electrolyte to a fuel cell stack such that said stack has a desired operating volume and concentration of electrolyte therein, said stack comprising a plurality of elements defining a plurality of fuel cell units disposed one atop the other in abutting relationship, said units defining a substantially flat, vertically extending external face, each unit including a cell comprising a pair of spaced apart gas porous electrodes with a porous matrix layer sandwiched therebetween for retaining electrolyte during cell operation, each unit also including a substantially non-porous separator, said separator being sandwiched between the cells of adjacent units, the steps of:

depositing dilute electrolyte of known concentration and from an external source directly onto said external face of the stack while it is in a non-operating mode, said deposited electrolyte being absorbed by capillary action into elements of said stack, said step of depositing continunig until all of said electrodes and matrix layers of said stack are fully saturated with the dilute electrolyte at substantially said known concentration; and thereafter, while said stack is in a non-operating mode, evaporating water from said saturated elements under selected conditions of humidity and temperature until a steady state condition is reached, the steady state condition being a condition wherein said stack has said desired electrolyte volume and electrolyte concentration therein.

2. The process according to claim 1 wherein said deposited electrolyte which is not absorbed by said stack runs off of said stack and is recaptured and redeposited on said face of said stack.

3. The process according to claim 1 wherein said step of depositing electrolyte comprises depositing phosphoric acid electrolyte.

4. The process according to claim 1 wherein said step of evaporating liquid from said stack comprises passing a gas through the cells of said stack and heating said stack, the dew point of said gas and the temperature to which said stack is heated being selected to result in the evaporation of an amount of water from said stack which, after steady state has been reached, will result in the said desired volume and concentration of electrolyte remaining within said stack.

5. The process according to claim 4 wherein said temperature to which said stack is heated is the normal operating temperature of said stack.

6. The process according to claim 1 wherein said step of depositing electrolyte includes creating a film of electrolyte covering substantially said entire face, which film continuously moves down said face.

* * * * *